United States Patent [19]

Breda

[11] Patent Number: 5,572,796

[45] Date of Patent: Nov. 12, 1996

[54] LASER BEAM PENDULAR LEVEL

[76] Inventor: Charles Breda, 5, rue de la Tour, 31150 Bruguieres, France

[21] Appl. No.: 393,288

[22] Filed: Feb. 23, 1995

[51] Int. Cl.$^6$ .............................. G01C 5/02; G01C 15/02
[52] U.S. Cl. ................................ 33/283; 33/285; 33/286; 33/366
[58] Field of Search ............................. 33/283, 281, 282, 33/285, 286, 291, 295, 397, 366

[56] References Cited

U.S. PATENT DOCUMENTS

| | | | |
|---|---|---|---|
| 2,633,028 | 3/1953 | Fillebrown | 33/366 |
| 2,825,978 | 3/1958 | Davis | 33/366 |
| 3,462,845 | 8/1969 | Matthews | 33/286 |
| 3,911,588 | 10/1975 | Ohneda | 33/286 |
| 4,106,207 | 8/1978 | Boyett et al. | 33/286 |
| 4,450,353 | 5/1984 | Sjolund | 33/366 |
| 4,751,782 | 6/1988 | Ammann | 33/291 |
| 5,184,406 | 2/1993 | Swierski | 33/291 |

*Primary Examiner*—Christopher W. Fulton
*Attorney, Agent, or Firm*—Eric Fincham

[57] ABSTRACT

A laser beam level which comprises a base, a support structure and a laser beam emitting assembly, the emitting assembly including a device for emitting a laser beam in a vertical Z plane and the emitting assembly being mounted in the support structure such that it is pivotable in both the X and Y horizontal planes. The base includes a concave depression having a spherical member mounted therein along with an electrical contact member such that when the base is tilted with respect to a horizontal plane, the spherical member will contact the electrical contact to complete an electric circuit between the base and electrical contact member.

9 Claims, 1 Drawing Sheet

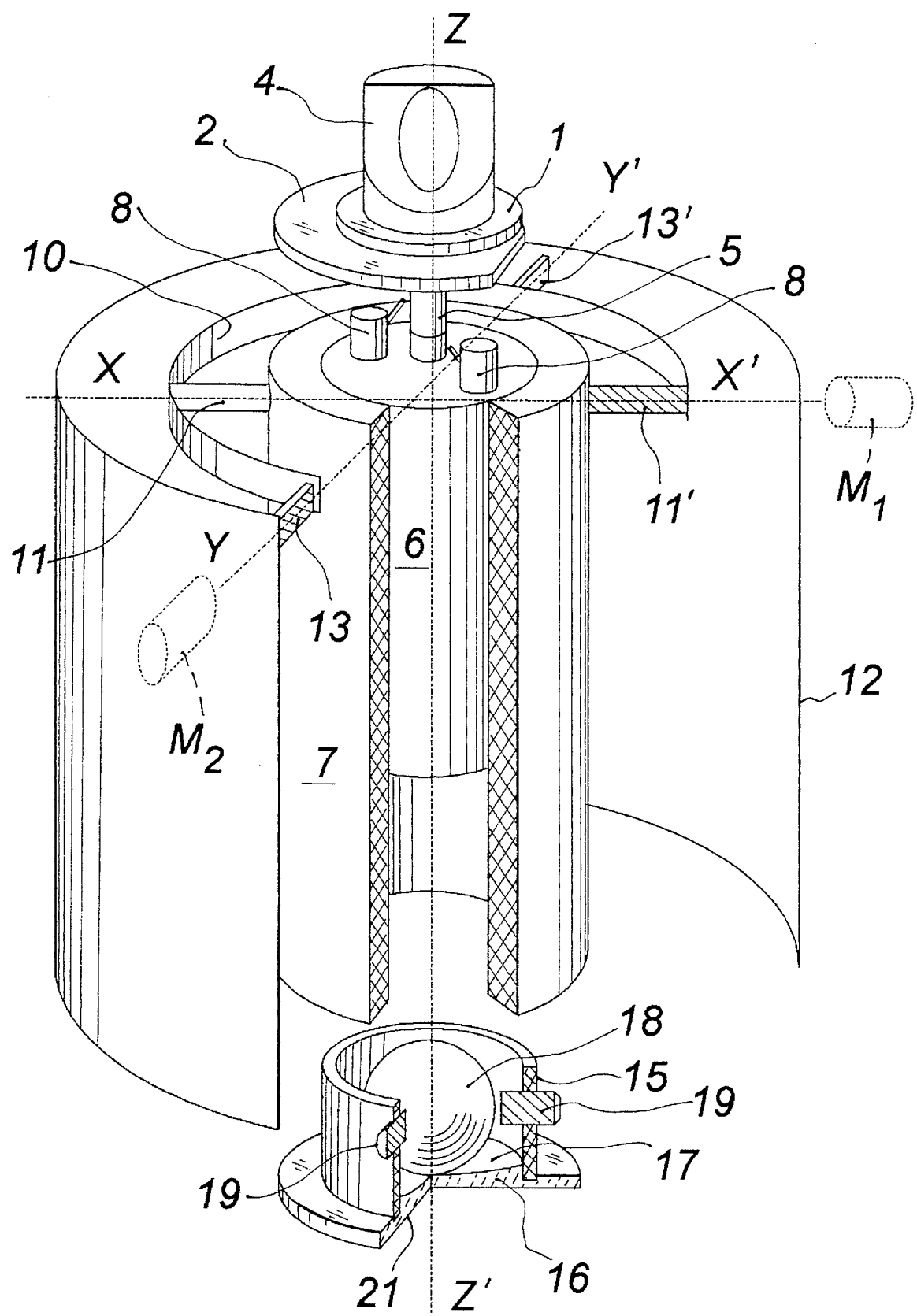

LASER BEAM PENDULAR LEVEL

BACKGROUND OF THE INVENTION

This invention relates to a laser beam pendular level.

Generally speaking, it is known that to perform sightings and tracings, devices combining a spirit level system with a laser beam emitter have been proposed.

For example, U.S. patent application Ser. No. 08/160,250 to Breda, outlines a device using:

- a calibrated tube, inside which resides a solid state laser emitting component of which the optical emitting axis coincides with the mechanical axis of the tube;
- means of reflecting the laser beam in a given direction towards the said axis;
- means of rotating the tube around this axis; and
- a tube support equipped with spirit levels of which the axis define an orthonormal mark.

Because of its design, such a device requires, each time it is used, an accurate adjustment of the vertical orientation of the tube axis, using the levels placed on the structure.

Practically, this operation turns out to be delicate and tedious to perform and this, all the more so, since sighting distances are significant and therefore, adjustments must be very accurate.

Furthermore, the visibility of spirit levels is often poor because of their small size, their position, and the dust which partially obscures them.

In addition, this type of device is normally used on construction sites in conditions unfavourable to allow one to perform adjustments with an high accuracy level.

SUMMARY OF THE INVENTION

Therefore, the present invention is specifically aimed at eliminating these drawbacks, and particularly at saving the operator from performing level verticality adjustments.

According to one aspect of the present invention, there is provided a laser beam level comprising a support structure and a laser beam emitting assembly. The laser beam emitting assembly included laser beam emitting means adapted to emit a laser beam in the Z plane (vertical). The assembly is mounted on the support structure so as to be pivotable in both the X and Y horizontal planes.

Thus, there is provided a device within which the means of laser beam emission are borne by an assembly of which a top end is mounted oscillatingly on a support structure around a center of rotation which is fixed in relation to said the structure. This device includes means of adjustment allowing (preferably at the factory) the axis of the aforesaid means of emission to coincide with an axis of the assembly going through its centre of gravity and the said centre of rotation.

It is clear that with such a design, once the aforesaid coincidence is achieved, the axis of the means of emission will be automatically aligned with the vertical.

As an added benefit, the means of laser beam emission could be operatively mounted so as to be driven by the rotating shaft of a motor of which the stator is mounted in the pendular element.

In this case, the axis of the aforesaid means of emission will coincide with the axis of the assembly.

Just like with the previous solution described earlier, the laser beam emitted by the aforesaid means of emission could be reflected at a 90 degree angle by a mirror oriented at a 45 degree angle from the incident beam.

An example of the invention is described below, with reference to the attached drawing in which:

BRIEF DESCRIPTION OF THE DRAWINGS

FIG. 1 is a schematic view, in a partial perspective and axial sections, with partial exploded and sectional views, of a laser beam level according to the invention.

DETAILED DESCRIPTION OF THE INVENTION

Referring to FIG. 1, the means of laser emission 1 are carried by a circular member 2. Emitter 1 emits a coaxial beam which is reflected at a 90 degree angle by a mirror not shown (or a prism) set at a 45 degree angle in relation to the axis, mounted within an optical head 4.

Member 2 is mounted coaxially on the rotating shaft 5 of an electric motor, having its cylindrical stator 6 fixed inside a solid tubular sleeve 7 which in turn is cylindrical in shape.

Preferably, the inside diameter of the sleeve 7 matches the outside diameter of the motor stator 6 so as to obtain a precise assembly with a guaranteed coaxiality of both these elements.

The mounting of member 2 on the motor axis 5 will be preferably done so as to obtain a rigorous coaxiality of the laser beam emitted by the means of emission 1 with the assembly of sleeve 7, stator 6, member 2 and emitter 1.

To allow for member 2 and the means of emission 1 of the laser beam to be rotated by the motor, slip rings 8 are provided between the electric motor/sleeve assembly and member 2. These slip rings could consist of the collector brushes of the motor, allowing one to obtain fixed connections between the rotor of the motor and member 2.

As may be seen, tubular sleeve 7 is joined in its top end to a coaxial ring 10, by two opposed coaxial swivels 11, 11' thereby defining a first axis of rotation XX' for sleeve 7.

Ring 10 is itself joined to a coaxial tubular support structure 12 (of which only the inside cylindrical surface has been shown) with two opposed coaxial swivels 13, 13' which define a second axis of rotation YY' perpendicular to the first plane and preferably located in the same plane as the latter, the intersection of both these axis of rotation making up a center of rotation located on the axis of the assembly formed by sleeve 7, stator 6, support member 2, and the means of laser emission 1.

Theoretically, with such a structure, the assembly centers itself vertically, and the beam, which is reflected by the mirror 3, scans a horizontal plane.

In practice, due to manufacturing tolerances and slight symmetry defects, it is possible that the original center of gravity of the assembly is slightly away from the ZZ' axis, and that the latter axis is not rigorously vertical.

Therefore, a factory setting is required to get the center of gravity back on the ZZ' axis.

To this end, the invention may provide a sensing system mounted at the lower end of the sleeve 7 which is designed to sense the vertical position of the ZZ' axis of the emitting assembly.

In the illustrated embodiment, the device includes a tubular length 15 of cylindrical section with an outside diameter equal to the inside diameter of the tubular sleeve 7 inside which it tightly fits.

At its lower end, length 15 is closed by a bottom 16 made of an electrically conductive material of which the inside surface 17 has a coaxial concave shape, preferably spherical.

A ball 18, made of an electrically conductive material, is placed inside length 15 and rolls freely on the inside surface 17 of the bottom 16 to indicate the vertical.

The tubular length 15, made of an electrically insulating material, has a set of contacts 19 projecting radially and interiorly of the inside volume of the length 15, in a cross-sectional plane of the latter spaced from the bottom 16 by a distance approximately equal to the radius of the ball 18.

With such a setup, when the tubular sleeve 7 is vertically centered, the ball 18 set in the center of the concave surface of the bottom 16, where it is away from each contact 19 by a given distance.

However, when the axis of the tubular sleeve 7 is tilted in relation to the vertical, the ball 18 moves away from the center of the bottom by indicating the direction to take to bring the ZZ' axis to the vertical. By moving away from the center, the ball 18 bumps against a contact 19 and creates an electrical connection between the bottom 16 and this contact 19. This connection can energize an indicator, for example a light, which tells the operator the type of setting required to reset the verticality of the sleeve axis.

Theoretically, this setting could be performed once and for all at the factory, so that the operator does not have to reset it afterwards.

As an added benefit, the sensor made up of the ball 18, the bottom 16, and contacts 19 will be able to switch off the laser emitter 1, in the case of an incorrect setting or an impact causing the ball 18 to lean against one of the contacts 19.

In this case, the level will only be usable after resetting (manually or automatically) it to have the ball 18 back in the center of the concave surface of the bottom 16.

Furthermore, the outside face 21 of the tubular length bottom 16 could also have a concave shape, preferably conical, on which could rest the conical end of a coaxial set screw put in a part (not shown) of a fixed structure, in order to lock the structure by self-centering.

Obviously the invention is not limited to the embodiment described above.

Thus, coaxial swivels 11, 11'–13, 13' could be driven by rotating two respective servo-actuators M1, M2 controlled by a servo-circuit energized from the position of the ball 18 sensed by the contacts 19 borne by the tubular length 15, this servo-circuit orienting the tubular sleeve 7 so that the ball 18 be placed in the center of the concave surface of the bottom 16. In this case, the verticality of the laser beam emitted by the means of emitter 1 is automatically set, regardless of the position of the center of gravity of the pendular element.

Once again, settings can be performed at the factory.

In addition, the optical head with the means of laser emission and which includes in this case a mirror 3 or a prism could be removable to be able to replace it with a head including, for example:

- an holographic grating to obtain the reflection of a set of aligned dots in a single direction (for example horizontally or vertically);
- a cylindrical lens to obtain the projection of a line, for example vertical or horizontal;
- a diaphragm to reduce laser radiation output (for example to meet standards).

It will be understood that the above described embodiment is for purposes of illustration only and that changes and modifications may be made thereto without departing from the spirit and scope of the invention.

I claim:

1. A laser beam level comprising a support structure and a laser beam emitting assembly, said laser beam emitting assembly comprising laser beam emitting means adapted to emit a laser beam in a Z-axis, said assembly being mounted on said support structure so as to be pivotable in an X plane and a Y plane said base including a concave depression having an electrically conductive surface, a spherical member having an electrically conductive surface free to move within said concave depression and at least one electrical contact member mounted such that when said base is tilted with respect to a horizontal plane, said spherical member will contact said electrical contact to complete an electric circuit between said base and said electrical contact member.

2. The laser beam level as defined in claim 1 wherein said laser beam emitting assembly further includes a support member for said laser beam emitting means, said support member being rotatable.

3. The laser beam level of claim 2 wherein said laser beam emitting assembly includes a tubular sleeve, said tubular sleeve enclosing a motor stator, a rotatably driven shaft extending from said stator, said rotatably driven shaft being connected to said rotatable member.

4. The laser beam level of claim 1 further including means for adjusting the position of said laser beam emitting assembly to ensure that said laser beam emitting mean are oriented in the Z plane.

5. The laser beam level of claim 1 wherein said laser beam emitting means includes an optical head having reflecting means therein for reflecting the laser beam at a 90° angle.

6. The laser beam level of claim 5 wherein said means for reflecting said laser beam is selected from a mirror and a prism.

7. The laser beam level of claim 4 wherein said optical head is removable.

8. The laser beam level of claim 1 wherein said assembly is mounted on said support structure by a first pair of coaxial swivels permitting said pivotal movement in said X plane and a second pair of coaxial swivels permitting movement in said Y plane.

9. The laser beam level of claim 8 wherein each of said pair of coaxial swivels are driven by servo-actuator controlled by a servo-circuit adapted to sense the verticality of said assembly.

* * * * *